United States Patent Office 2,992,968
Patented July 18, 1961

2,992,968
NEW FUNGICIDAL 3-HETEROCYCLIC-3,4,5-TRI-
CHLORO-4-CYCLOPENTENE-1,2-DIONES
Sidney B. Richter, Chicago, Ill., assignor to Velsicol
Chemical Corporation, Chicago, Ill., a corporation of
Illinois
No Drawing. Filed Mar. 19, 1959, Ser. No. 800,400
7 Claims. (Cl. 167—33)

This invention relates to new chemical compositions of matter. More specifically, this invention relates to new chemical compounds of the general formula

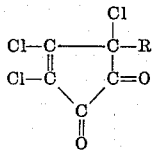

wherein R can be any of the radicals

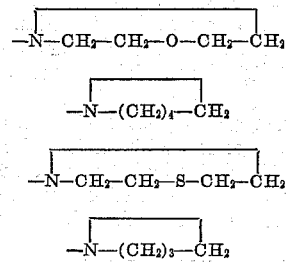

and

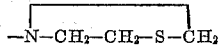

These new compounds are useful as pesticides, particularly as fungicides.

The new compounds of this invention can be prepared readily by the condensation of hexachloro-2-cyclopenten-1-one with the appropriate known cyclic imine (namely morpholine, piperidine, thiamorpholine, pyrrolidine, or thiazolidine). The required hexachloro-2-cyclopenten-1-one can be obtained, for example, by the treatment of octachlorocyclopentene with concentrated sulfuric acid as described by Newcomer and McBee, J. Am. Chem. Soc. 71, 946 (1949). At least one molecular proportion of the imine should be used for each molecular proportion of the hexachlorocyclopentenone, but it is preferred to use an excess of the imine. The reaction is carried out conveniently in an inert solvent or diluent such as an aromatic hydrocarbon. While the reaction can often be carried out satisfactorily at normal room temperature, it is preferred to drive the reaction to as near completion as possible by heating the reaction mixture for several hours at a temperature of up to about the reflux temperature of the solvent or diluent employed. The cooled reaction mixture is then washed thoroughly by shaking with water, after which it is dried over a suitable anhydrous drying agent such as calcium chloride. The product can be isolated by distilling off the solvent or diluent in vacuo. The product obtained in this manner is often suitable for pesticidal use without further purification, but if desired it can be purified, for example, by recrystallization from a suitable solvent.

The manner in which the chemical compounds of this invention can be prepared is illustrated in the following examples:

EXAMPLE 1

*Preparation of 3-morpholino-3,4,5-trichloro-4-cyclopentene-1,2-dione*

Hexachloro-2-cyclopenten-1-one (58 g.; 0.2 mole) was dissolved in 280 ml. of benzene in a 1-liter, round-bottomed flask fitted with a mechanical stirrer, dropping funnel, and reflux condenser. A solution of morpholine (34.8 g.; 0.4 mole) in 160 ml. benzene was then added dropwise to the stirred ketone over a period of 1.5 hours. The reaction mixture was then stirred and refluxed for 1 hour, cooled, filtered, washed thoroughly by shaking with water, and dried over anhydrous calcium chloride. The benzene was then distilled from the filtered solution in vacuo to leave a dark, oily residue, which was dissolved in acetone and treated with Nuchar CN. The acetone was distilled from the filtered solution in vacuo to leave a red oil, which was crystallized from heptane to give 10 g. (18% of theory) of yellow 3-morpholino-3,4,5-trichloro-4-cyclopentene-1,2-dione. The product was recrystallized several times from methanol to give crystals, melting point 166–168° C.

Analysis for $C_9H_8Cl_3NO_3$.—Theory: Cl, 37.42%; total N, 4.92%. Found: Cl, 37.69%; total N, 5.08%.

The other compounds within the scope of this invention can be prepared in the manner detailed above. Given in the following examples are the appropriate cyclic imine required for reaction with hexachloro-2-cyclopenten-1-one (referred to for brevity as "A") to give the indicated named compounds of this invention:

Example 2: Piperidine+A=3-piperidino-3,4,5-trichloro-4-cyclopentene-1,2-dione
Example 3: Thiamorpholine+A=3-thiamorpholino-3,4,5-trichloro-4-cyclopentene-1,2-dione
Example 4: Pyrrolidine+A=3 - pyrrolidino - 3,4,5 - trichloro-4-cyclopentene-1,2-dione
Example 5: Thiazolidine+A=3-thiazolidino-3,4,5-trichloro-4-cyclopentene-1,2-dione The utility of the compounds of this invention as pesticides is illustrated by experiments carried out with the product of Example 1, namely 3-morpholino-3,4,5-trichloro-4-cyclopentene-1,2-dione. For example, candidate compounds were evaluated by a modified Zentmyer vial technique for soil fungicide effectiveness of various concentrations of dispersions or solutions of the compounds applied to the surface of 60 grams of sterilized soil in which a mycelial plug of the test organism had been embedded. The plug was left intact for 24 hours following chemical application, after which it was removed, washed free of soil and extraneous matter, and placed on an agar plate. Mycelial development was then observed periodically and compared with development on untreated plugs. In the experiments with the organisms *F. roseum* and *R. solani*, the technique was modified in that the candidate compounds were dissolved in acetone and the resulting solutions were mixed thoroughly with a predetermined weight of soil. Following thorough mixing, the acetone was evaporated off, leaving a uniform mixture of compound and soil as "treated soil." Weighed increments of treated soil were then placed in vials, mycelial plugs inserted, and the covering portion of treated soil added. From 3 to 5 replicates were used for each level of chemical application. The results observed with the product of Example 1 are summarized in the table below:

| Concn., p.p.m. | Number of Plugs Used | Organism | Number of Plugs Showing Mycelial Growth after the following hours | | | | | | | |
|---|---|---|---|---|---|---|---|---|---|---|
| | | | 20 | 24 | 44 | 48 | 72 | 96 | 120 | 144 |
| 100 | 4 | Verticillium albo-atrum | 0 | 0 | 0 | 0 | 0 | 1 | 1 | 1 |
| | 4 | Control (Water) | 4 | 4 | 4 | 4 | 4 | 4 | 4 | 4 |
| 1,000 | 4 | Pythium spp | 0 | 0 | 0 | 0 | 4 | 4 | 4 | 4 |
| | 4 | Control (Water) | 4 | 4 | 4 | 4 | 4 | 4 | 4 | 4 |
| 100 | 4 | Sclerotinia spp | 0 | 0 | 0 | 0 | 0 | 0 | 0 | 0 |
| | 4 | Control (Water) | 4 | 4 | 4 | 4 | 4 | 4 | 4 | 4 |
| 100 | 3 | Fusarium roseum | ---- | 0 | ---- | 0 | 0 | 0 | 1 | ---- |
| | 3 | Control | ---- | 3 | ---- | 3 | 3 | 3 | 3 | ---- |
| 100 | 3 | Rhizoctonia solani | ---- | 0 | ---- | 0 | 0 | 0 | 0 | ---- |
| | 3 | Control | ---- | 3 | ---- | 3 | 3 | 3 | 3 | ---- |

Another modification of the Zentmyer vial technique was also used to evaluate candidate compounds as soil fungicides. In this soil drench method, a predetermined weight of the candidate compound was dissolved in acetone containing 0.1 percent of a wetting agent. The resulting solution was then diluted to volume with water, and portions were added as a drench to the surface of potted greenhouse soil naturally infected with the organisms *F. roseum* and *R. solani*. Forty-eight hours later, following volatilization of the acetone, seeds of Perfection peas were planted in the pots. The ability of the drench-type treatment to control the soil inhabiting pathogens was determined by percentage emergence and final stand resulting from the seeds planted. Three replicates were used for each test increment. In these experiments, the product of Example 1 used at a concentration equivalent to 150 lbs. per acre gave an average of 87% emergence in 14 days compared to only 2% in the untreated controls.

Pesticidal compositions of this invention are prepared by mixing one or more of the new compounds of this invention with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogeneous, free-flowing dusts by admixing the active compound or compounds of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. The surface-active agents can be of the anionic, cationic or nonionic types. Typical examples of such surface-active agents are sodium stearate, potassium laurate, morpholine oleate, sodium lauryl sulfate, sodium 2-ethylhexyl sulfate, sodium naphthalenesulfonate, sodium alkylnaphthalenesulfonate, sodium sulfosuccinate, sodium oleic acid sulfonate, sodium castor oil sulfonate, glycerol monostearate containing a soap (or a sodium fatty alcohol sulfate), lithium stearate, magnesium oleate, aluminum stearate, methyl cellulose, sodium salt of ligninsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylenepolyol fatty acid esters, polyol fatty acid monoesters, lecithin, di- and higher polyhydric alcohol fatty acid esters, cholesterol and other fatty acid esters, lanolin, oxidized fatty oils, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal compositions. Other pesticides as well as such substances as fertilizers, activators, adhesives, spreaders, and synergists can be added to these formulations if desired. The manner in which typical pesticidal compositions according to this invention can be prepared is illustrated in the following examples. All quantities given are in parts by weight.

EXAMPLE 6

*Preparation of an emulsifiable concentrate*

The following ingredients are blended thoroughly until a homogeneous liquid concentrate is obtained. This concentrate is mixed with water to give an aqueous dispersion containing the desired concentration of active compound for use as a spray.

| | |
|---|---|
| 3-morpholino - 3,4,5 - trichloro-4-cyclopentene-1,2-dione | 25 |
| Sodium lauryl sulfate | 2 |
| Sodium lignin sulfonate | 3 |
| Kerosene | 70 |

EXAMPLE 7

*Preparation of a wettable powder*

The following components are mixed intimately in conventional mixing or blending equipment and are then ground to a powder having an average particle size of less than about 50 microns. The finished powder is dispersed in water to give the desired concentration of active compound.

| | |
|---|---|
| 3-piperidino - 3,4,5 - trichloro-4-cyclopentene-1,2-dione | 75.00 |
| Fuller's earth | 22.75 |
| Sodium lauryl sulfate | 2.00 |
| Methyl cellulose | .25 |

EXAMPLE 8

*Preparation of an oil-dispersible powder*

The following components are blended and ground as described in the previous example to give a powder

| | |
|---|---|
| 3-thiamorpholino-3,4,5-trichloro-4-cyclopentene-1,2-dione | 70 |
| Condensation product of diamylphenol with ethylene oxide | 4 |
| Fuller's earth | 26 |

EXAMPLE 9

*Preparation of a dust*

The following ingredients are mixed thoroughly and then ground to an average particle size of less than about 50 microns to give a dust suitable for application with conventional dusting equipment.

| | |
|---|---|
| 3-pyrrolidino-3,4,5-trichloro-4-cyclopentene-1,2-dione | 20 |
| Talc | 80 |

EXAMPLE 10

*Preparation of a granular formulation*

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

| | |
|---|---|
| 3-thiazolidino-3,4,5-trichloro-4-cyclopentene-1,2-dione | 10 |
| Fuller's earth | 66 |
| Dextrin | 20 |
| Sodium lignin sulfonate | 3 |
| Kerosene | 1 |

When the compounds and compositions of this invention are used as fungicides to control or prevent plant diseases caused by fungi or bacteria, they are used in several ways, depending on the particular chemical, the nature of the disease, and the nature of the plant attacked. They may be used as preventive agents to form a toxic barrier between the inoculum and the host tissue, to inhibit the production of inoculum, or to destroy the inoculum before it reaches the site of infection. They may be used as eradicating agents to destroy the disease-producing organism or its inoculum on the host tissue or in the soil. They may be used as curatives or therapeutic agents to destroy the disease-producing organisms within the plant tissues, halt their growth, or inhibit the development of their toxins or counteract them. They may also be used as prophylactic agents to immunize plants against disease. The compounds of this invention can be useful in any one or more of the above ways, but since it is much easier to protect plants from disease rather than to cure disease, the chemicals are best used in the form of protectants. These protective chemicals can act to prevent sporulation and thus reduce or eliminate the inoculum necessary for the spread of a disease. They can also prevent spores from completing their germination or incubation stage so that no infection ensues. These eradicant chemicals, which can also be considered broadly as protectants, are used to destroy disease-producing organisms or their inoculum in the soil, in dead plant organs, or on living plant tissue. When used to treat soil or seed, these compounds are usually referred to as disinfectants or disinfestants. The compounds of this invention are also useful for the control of fungal growth on wood, plastics, textiles, and like materials.

When used for the control of plant diseases, the compounds of this invention can be used as seed treatments, soil treatments, or plant treatments. Many of the disease-producing bacteria and the fungi that cause blights, spots, and rots are carried on or in seeds, roots, bulbs, tubers, corms, or other seed stock that is purchased by growers. These disease-producing organisms can be destroyed by dipping the seed or planting stock in liquid formulations of the compounds of this invention. Many plant pathogens are also soil-borne, and the application of the active compounds to the soil is one of the useful methods for control or eradication of the organisms, particularly in greenhouses, cold frames, hotbeds, and seedbeds. Both solid and liquid compositions of the compounds of this invention can be used in such soil treatments, which are also effective for soil nematode control. Plant treatments by chemicals in the form of liquid or solid fungicidal compositions are made on growing crops or on crop residues either to prevent the appearance or spread of diseases or to destroy the disease-causing organisms already present or both. This type of treatment is essential for plant protection from air-borne pathogenes and is also useful in controlling many seed- and soil-borne pathogenes that spread externally to the upper parts of plants. Such treatment includes the application of the active chemicals internally to prevent or destroy diseased conditions. The active compounds of this invention are applied by any of these methods in amounts sufficient to exert the desired pesticidal action. The amount of the active compound present in the pesticidal compositions as actually applied for destroying or preventing pest infestations varies with the type of application, the particular pests which are to be controlled, the purpose for which the treatment is made, and the like. Generally, the solid or liquid pesticidal compositions of this invention will contain from about 0.5% to about 90% of the active compounds.

I claim as my invention:

1. A compound of the formula

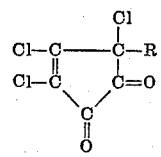

wherein R is selected from the group consisting of the radicals

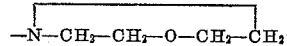

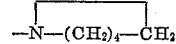

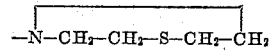

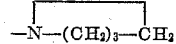

and

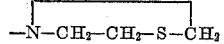

2. 3-morpholino-3,4,5-trichloro-4-cyclopentene-1,2-dione.

3. 3-piperidino-3,4,5-trichloro-4-cyclopentene-1,2-dione.

4. 3-thiamorpholino-3,4,5-trichloro-4-cyclopentene-1,2-dione.

5. 3-pyrrolidino-3,4,5-trichloro-4-cyclopentene-1,2-dione.

6. 3-thiazolidino-3,4,5-trichloro-4-cyclopentene-1,2-dione.

7. A method of destroying undesirable fungi which comprises contacting said fungi with a fungicidal composition comprising an inert carrier and as the essential active ingredient, in a quantity which is injurious to said fungi, a compound of the formula
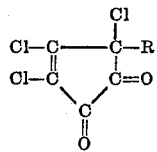
wherein R is selected from the group consisting of the radicals
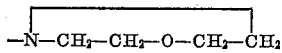
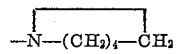
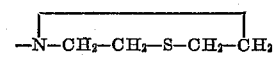
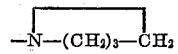
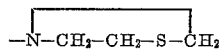
No references cited